J. WRAY.
FRICTION CHANGE SPEED MECHANISM.
APPLICATION FILED FEB. 2, 1914.
1,165,354.
Patented Dec. 21, 1915.
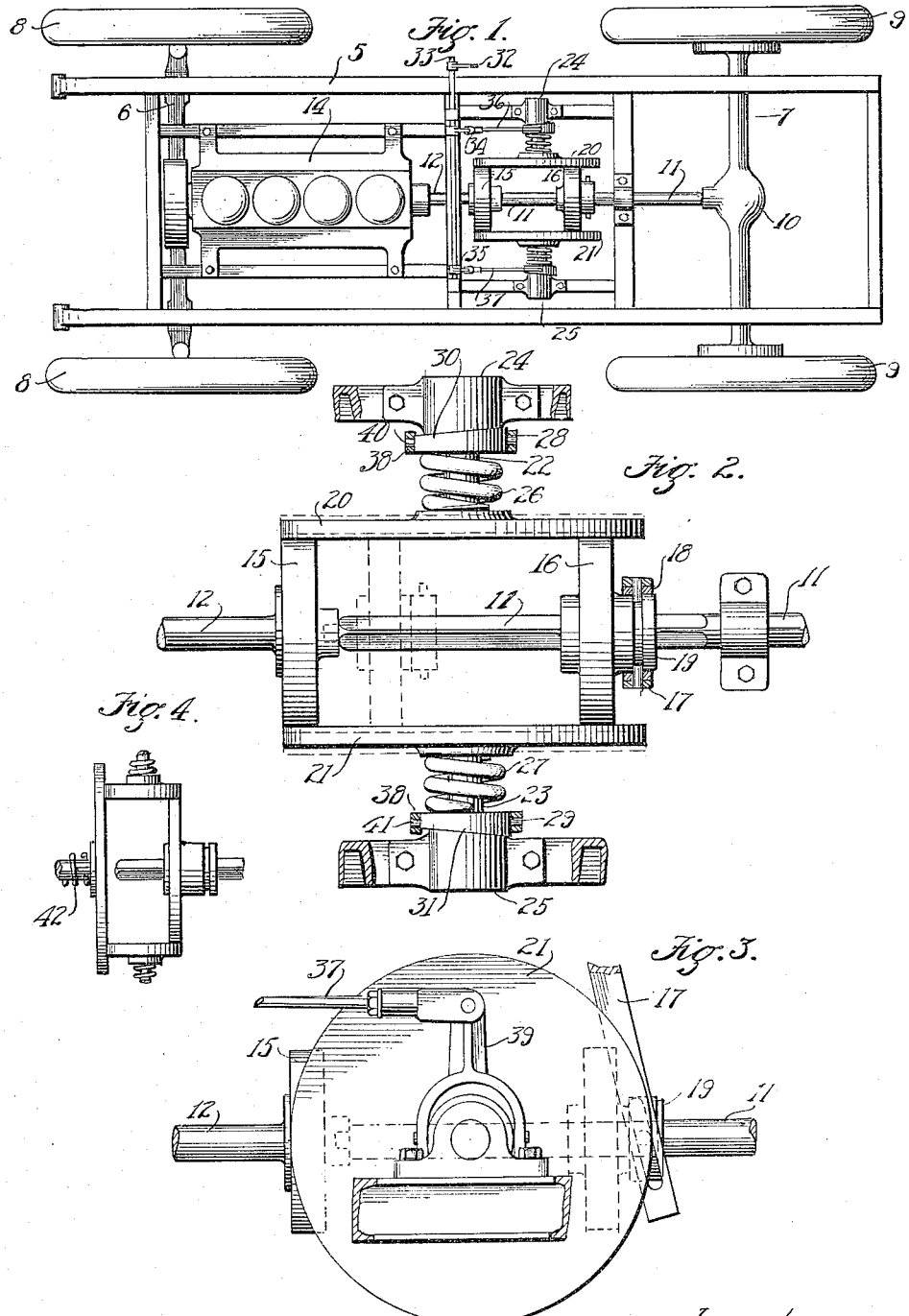
Witnesses:
James M. Abbett
Marguerite Bates
Inventor:
Joy Wray
By
Howard & Shawro
Atty's.

UNITED STATES PATENT OFFICE.

JAY WRAY, OF LOS ANGELES, CALIFORNIA, ASSIGNOR OF ONE-HALF TO WASHINGTON I. TURCK, OF LOS ANGELES, CALIFORNIA.

FRICTION CHANGE-SPEED MECHANISM.

1,165,354.      Specification of Letters Patent.      Patented Dec. 21, 1915.

Application filed February 2, 1914. Serial No. 815,931.

*To all whom it may concern:*

Be it known that I, JAY WRAY, a citizen of the United States, residing at Los Angeles, in the county of Los Angeles, State of California, have invented new and useful Improvements in Friction Change-Speed Mechanisms, of which the following is a specification.

This invention relates to a friction change speed mechanism.

It is the object of this invention to provide a balanced friction drive by means of which the power transmitted from a driving shaft to a driven shaft is taken from opposite sides of the driving shaft and delivered to the driven shaft from opposite sides of a shiftable friction disk thereon so as to obviate lateral thrusts on either of the shafts and increase traction effort.

Another object is to provide a change speed friction drive for transmitting variable speeds from a driving shaft to a driven shaft by which the shafts may be arranged in vertical alinement with respect to each other.

Another object is to provide means for varying the frictional engagement of a pair of spring pressed transmission friction disks on opposite sides of the centers of driving and driven disks whereby the traction effort may be reduced to *nil* to permit free sliding movement of the movable change speed disk, and regulated to increase the effectiveness of the driving power.

Other objects will appear hereinafter.

The invention primarily resides in a pair of transmission friction disks arranged to engage a driving disk and a driven disk on opposite sides of the centers thereof, and means for shifting the driven disk on a shaft to be driven in such relation to the pair of friction disks as to vary the speed and direction of rotation of the driven shaft in relation to the driving shaft, and means for varying the frictional engagement of the transmission disks.

Figure 1 is a plan view of the power-propelled vehicle, showing the invention as applied thereto. Fig. 2 is an enlarged detail plan view of the invention. Fig. 3 is a side elevation of same. Fig. 4 is a detail showing a modified form of the invention.

More specifically, 5 indicates a vehicle frame supported upon front and rear axles 6 and 7, respectively, provided with front wheels 8 and rear wheels 9; the rear axle 7 being tubular and containing a drive shaft connected with the wheels 9 and fitted with the usual differential gears arranged in a casing 10 on the rear axle, which differential gears connect with the driven shaft 11 supported in suitable bearings and extending longitudinally of the frame 5, preferably in longitudinal alinement with the driving shaft 12 of an engine 14 of any suitable character.

The essence of the present invention resides in a means for transmitting rotary movement from the driving shaft 12 to the driven shaft 11 by which the latter may be rotated in either direction and at a variable speed in relation to the drive shaft 12 through the medium of a novel arrangement of friction disks, whereby the vehicle may be propelled in either direction at variable speeds.

The preferred construction of the friction transmission means is as follows: Rigidly mounted on the driving shaft 12 is a friction disk 15 and slidably mounted on a squared portion of the driven shaft 11 is a corresponding friction disk 16 which is adapted to be shifted longitudinally of the driven shaft toward and away from the friction disk 15 by means of a lever 17 fulcrumed at any suitable point and having the usual pin and slot connection with a ring 18 carried in a groove on a hub 19 on the friction disk 16. Disposed on opposite sides of the friction disks 15 and 16 is a pair of transmission friction disks 20 and 21 supported upon stud shafts 22 and 23 revolubly mounted in bearings 24 and 25; the transmission friction disks 20 and 21 having their parallel faces adapted to be held in frictional engagement with the peripheral edges of the friction disks 15 and 16 by means of springs 26 and 27, which bear between the disks 20 and 21, and sleeves 28 and 29 revolubly and slidably mounted on the stud shafts 22 and 23. The springs 26 and 27 are so tensioned that when the sleeves 28 and 29 are in their normal rearmost position the pressure exerted thereby on the disks 20 and 21 will not be sufficient to frictionally engage the latter with disks 15 and 16. The sleeves 28 and 29 are provided with inclined faces 30 and 31 which abut against corresponding inclined faces formed on the bearings 24 and 25 and are normally held thereagainst by the action of the springs 26 and 27. The sleeves 28 and 29 are designed to be turned in unison on the stud shafts 22 and 23 so as to cause them to be advanced or retracted by reason of the inclined faces 30 and 31 riding over the inclined faces of the bearings 24 and 25 when the sleeves 28 and 29 are rotated so as to vary the pressure of the springs 26 and 27 against the friction disks 20 and 21, and consequently vary the frictional engagement between the friction disks 20 and 21 and the friction disks 15 and 16 from *nil* to maximum. The rotation of the sleeves 28 and 29 is effected through a lever 32 connected with a rock shaft 33 having lever arms 34 and 35 rigidly mounted thereon, the outer ends of which are attached to connecting rods 36 and 37 connected with yokes 38 and 39 engaging the sleeves 28 and 29 by means of pins 40 and 41.

It will be seen that the friction disks 20 and 21 will bear equally against the opposite sides of the friction disks 15 and 16 when subjected to pressure through the springs 26 and 27, so that when the friction disk 15 is rotated the friction disks 20 and 21 will be rotated therewith and will in turn effect the rotation of the friction disk 16 and the driven shaft 11. When it is desired to vary the speed of rotation, of the driven shaft 11 in relation to the driving shaft 12, the friction disk 16 is shifted through the medium of the lever 17 to various positions in relation to the centers of the friction disks 20 and 21, thereby varying the speed of rotation of the friction disk 16 in relation to the disks 20 and 21, as is common in friction driving mechanism. When it is desired to stop the rotation of the driven shaft 11, the transmission friction disks 20 and 21 are disposed out of frictional engagement with the friction disks 15 and 16 so that the friction disk 16 and drive shaft 11 will not be rotated on rotation of the disk 15; the disks 20 and 21 being thus operated by retracting the sleeves 28 and 29. To reverse the direction of rotation of the driven shaft 11 the friction disk 16 is moved to the opposite side of the centers of the friction disks 20 and 21 as is indicated in dotted lines in Fig. 2, the speed of reversed rotation of the shaft 11 being varied according to the distance of the disk 16 from the center of the disks 20 and 21.

In event of a tendency of the friction disks 15 and 16 to slide in relation to the friction disks 20 and 21, as might be occasioned when the driven shaft 11 is subjected to an unusual load, the frictional engagement of the disks 20 and 21 with the disks 15 and 16 is increased by operating the lever 32 to advance the sleeves 28 and 29 on the stud shafts, and thereby increase the pressure exerted on the friction disks 20 and 21 by the springs 26 and 27.

By providing the opposite friction disks 20 and 21 power will be transmitted to the driven friction disk 16 equally on opposite sides thereof, thereby obviating lateral thrusts.

It is manifest that the arrangement of the various friction disks in relation to each other is subject to modification, such, for instance, as illustrated in Fig. 4 in which the friction disk 15 on the drive shaft is illustrated as engaging the peripheral edges of the spring-pressed friction disks 20 and 21; the latter thus bearing solely against the shiftable friction disk 16 and the driving friction disk 15, which in this instance is keyed on the shaft 12, is held in engagement with the disks 20 and 21 by means of a spring 42. It is also manifest that while I have described the driven disk as shiftable, the driving disk or both the driving and driven disks may be so mounted as to be shiftable separately or in unison. By the arrangement herein set forth the transmitted power is taken from opposite sides of the driving shaft and delivered to opposite sides of the driven shaft so as to equalize the distribution of forces.

What I claim is:

In a friction change speed mechanism, the combination with a driving shaft and a driven shaft, of a friction disk slidably mounted on one of said shafts, a friction disk slidably mounted on and rotatable with the other shaft, a pair of corresponding transmission friction disks arranged on opposite sides of the centers of the before mentioned disks, stud shafts secured to each of said last mentioned pair of friction disks, helical springs mounted about each stud shaft, sleeves having inclined faces rotatably mounted on each stud shaft, bearing caps provided with inclined faces, and means to rotate said sleeves.

In witness that I claim the foregoing I have hereunto subscribed my name this 23rd day of January, 1914.

JAY WRAY.

Witnesses:
MARGUERITE BATES,
MARIE BATTEY.